United States Patent [19]

Noda et al.

[11] Patent Number: 4,543,636

[45] Date of Patent: Sep. 24, 1985

[54] NUMERICALLY CONTROLLED MACHINE TOOL SYSTEM CAPABLE OF SETTING UP TOOLS INTO TOOL MAGAZINE

[75] Inventors: Shigeo Noda, Nagoya; Yasuhiro Yamashita, Okazaki; Kosei Imamura, Kariya, all of Japan

[73] Assignee: Toyoda Koki Kabushiki Kaisha, Kariya, Japan

[21] Appl. No.: 463,808

[22] Filed: Feb. 4, 1983

[30] Foreign Application Priority Data

Feb. 19, 1982 [JP] Japan .................................. 57-26663

[51] Int. Cl.$^4$ ....................... G06F 15/46; G05B 19/18
[52] U.S. Cl. .................................. 364/474; 364/167; 318/569; 29/568
[58] Field of Search ................................ 364/468–469, 364/474–475, 478, 167; 318/560–562, 567–569; 29/568

[56] References Cited

U.S. PATENT DOCUMENTS

| | | | |
|---|---|---|---|
| 3,576,540 | 4/1971 | Fair et al. ...................... | 318/562 X |
| 4,034,465 | 7/1977 | Shelton ............................. | 29/568 |
| 4,039,785 | 8/1977 | Ziemann ........................... | 364/478 X |
| 4,110,897 | 9/1978 | Hipwell et al. .................. | 29/568 |
| 4,141,133 | 2/1979 | Grinage ............................ | 29/568 |
| 4,344,221 | 8/1982 | Pagani .............................. | 29/568 |
| 4,369,563 | 1/1983 | Williamson ...................... | 29/568 |

FOREIGN PATENT DOCUMENTS 53-21543  7/1978  Japan ................................ 74/212 A

*Primary Examiner*—Joseph Ruggiero
*Assistant Examiner*—Gary V. Harkcom
*Attorney, Agent, or Firm*—Oblon, Fisher, Spivak, McClelland & Maier

[57] ABSTRACT

A numerically controlled machine tool system having a tool transfer device which, with a change in the kind of workpieces to be machined in a numerically controlled machine tool, operates to replace successively unnecessary dedicated tools in a tool magazine of the machine tool with next to be used dedicated tools supplied to the vicinity of the tool magazine. A central processor reads out from an external memory device one of the numerical control (NC) programs corresponding to the kind of a lot of workpieces to be machined and transmits the NC program to a numerical controller. In advance of the machining of a last one of the lot of workpieces, the central processor modifies the NC program by inserting respectively into correct portions of the NC program a number of replacing command data each instructing that one of the dedicated tools in the tool magazine designated by one of the replacing command data be replaced. When the numerical controller executes the modified NC program for machining the last one of the lot of workpieces, tool replacing operations according to the replacing command data are successively carried out. Accordingly, during the machining of the last one of the lot of workpieces, the dedicated tools in the tool magazine designated by the replacing command data are successively indexed to a tool replacing position of the tool magazine and are successively replaced by the transfer device with the next used dedicated tools in the vicinity of the tool magazine.

6 Claims, 23 Drawing Figures

FIG. 6(a) TSTT

| SOCKET NO. | TOOL REFERENCE NO. |
|---|---|
| 0 | 2005 |
| 1 | 2880 |
| ---- | ---- |
| n | 5670 |

FIG. 6(b) ETT

| CURRENT | NEXT |
|---|---|
| 3100 | 1620 |
| 4312 | 5334 |
| 2005 | 2880 |
| ---- | ---- |

FIG. 5(b) STDT

| WORKPIECE A | |
|---|---|
| 2005 | |
| 3100 | |
| ---- | |
| WORKPIECE B | |
| 2880 | |
| 1620 | |
| ---- | |
| WORKPIECE H | |
| 4530 | |
| 2301 | |
| ---- | |

FIG. 5(a) MMTT

| SOCKET NO. | TOOL REFERENCE NO. |
|---|---|
| 0 | 1045 |
| 1 | 2005 |
| 2 | 3100 |
| ---- | ---- |
| n | 1500 |

FIG. 5(c) ETMT

| CURRENT | NEXT | SOCKET NO. | C |
|---|---|---|---|
| 3100 | 1620 | 2 | |
| 4312 | 5334 | 10 | |
| 2005 | 2880 | 1 | |
| ---- | ---- | ---- | |

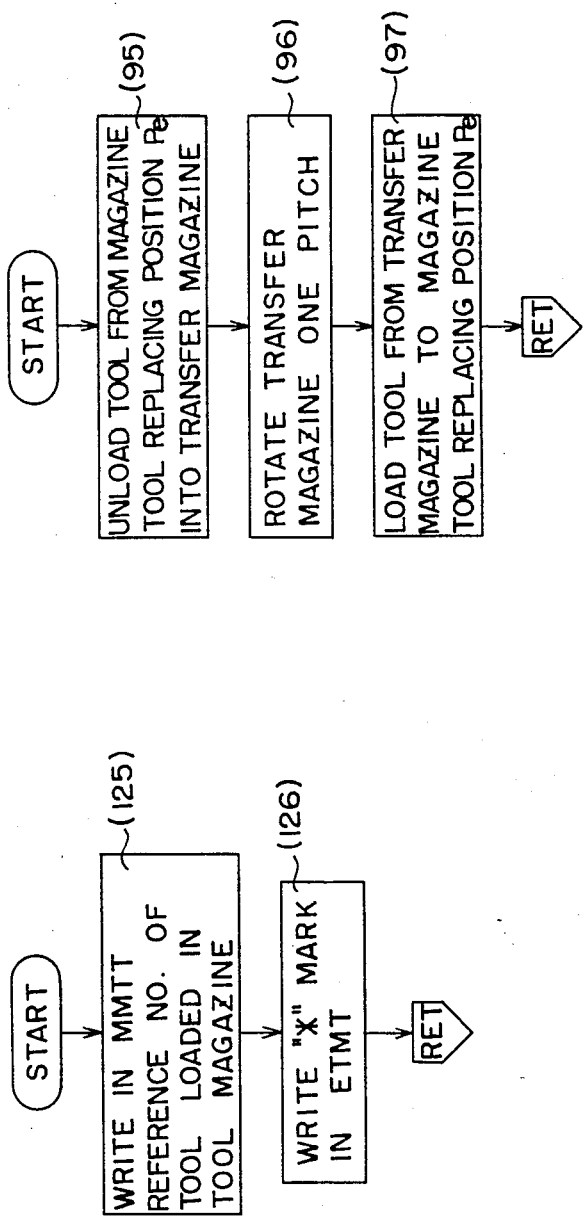

FIG.11(a)

| CURRENT | NEXT | SOCKET NO. | C | ETMT |
|---------|------|------------|---|------|
| 2005 | 2880 | 1 | | |
| 3100 | 1620 | 2 | | |
| 4312 | 5334 | 10 | | |
| ⋮ | ⋮ | ⋮ | | |

FIG.11(b)

| CURRENT | NEXT | SOCKET NO. | C | ETMT |
|---------|------|------------|---|------|
| 3100 | 1620 | 2 | ✗ | |
| 4312 | 5334 | 10 | ✗ | |
| 2005 | 2880 | 1 | | |
| ⋮ | ⋮ | ⋮ | | |

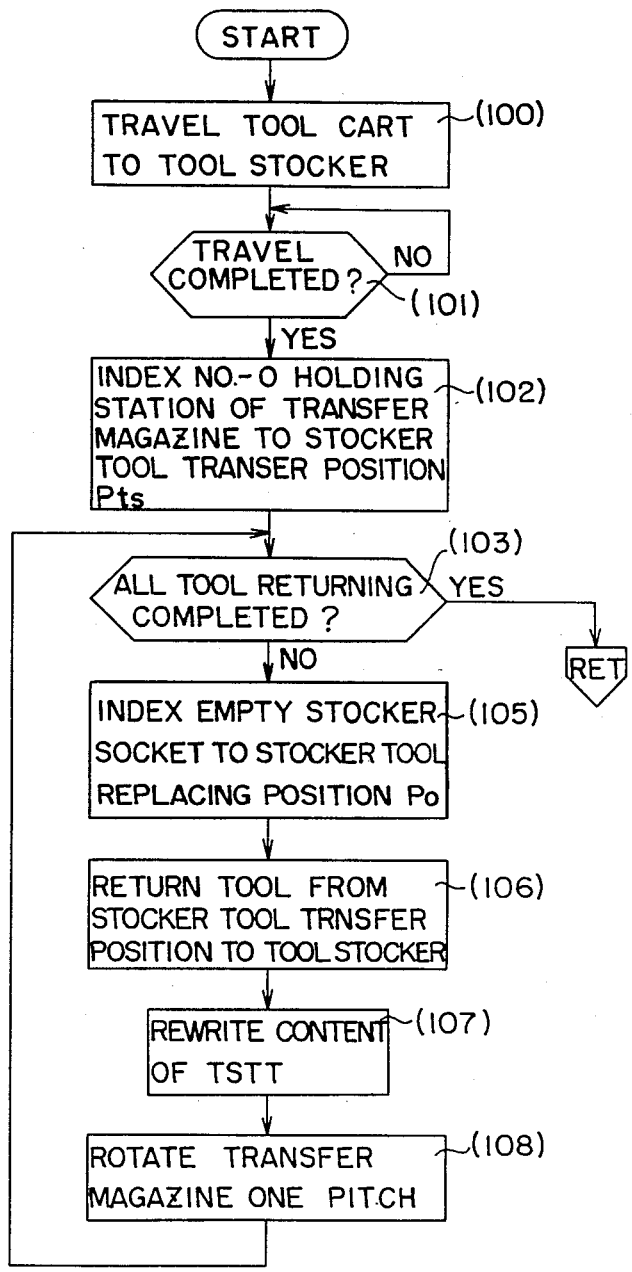

```
N001 X3000 Y5000
N002 T3100
N003 M06
N004 T4312
N005 S800      M03
  ⋮
N015 G00  Y2000
N016 M06
N017 X2000
N018 T4200
N019 Y1500 Z200
```

```
N001 X3000 Y5000
N002 T3100
N003 M06
N004 T4312
N005 S800      M03
  ⋮
N015 G00  Y2000
N016 M06
N017 T3100 M70
N018 X2000
N019 T4200
N020 Y1500 Z200
```

NUMERICALLY CONTROLLED MACHINE TOOL SYSTEM CAPABLE OF SETTING UP TOOLS INTO TOOL MAGAZINE

BACKGROUND OF THE INVENTION

1. Field of the Invention

This invention relates to a numerically controlled (NC) machine tool system capable of replacing a part of a plurality of tools stored in a tool magazine of a machine tool with a number of next to be used tools in connection with a change in the kind of workpieces to be nextly machined.

2. Description of the Prior Art

Generally, a tool magazine provided in a numerically controlled machine tool called a "machining center" has a limitation on the number of tools storeable therein. It is therefore usual that tools stored in the tool magazine are insufficient in number to machine several kinds of workpieces. To solve this problem, a known numerically controlled machine tool employs a number of exchangeable tool magazines each storing a plurality of tools prepared for respective workpieces, and the exchangeable tool magazines are selectively attached to the machine tool when the respective workpieces are machined. In the known machine tool, however, a number of the same tools are commonly used to machine several kinds of workpieces and must be stored in each of the exchangeable tool magazines. This results in inefficient use of tools. The known machine tool further requires the provision of large capacity tool magazines, the number of which corresponds to the number of kinds of workpieces to be machined in the machine tool, thus needing a huge space for installation.

In another known numerically controlled machine tool, tools are stored in a tool magazine, and only a number of tools unnecessary for subsequent machinings are successively indexed to a replacing position of the tool magazine and are successively replaced with a number of tools having been supplied to the vicinity of the tool magazine when a different kind of workpiece is next to be machined. This machine tool avoids the foregoing drawbacks. However, after the machinings of a previous kind of workpieces, the unnecessary tools are indexed to the replacing position one-by-one and are replaced with the next to be used tools, such that considerable time is consumed for tool replacement in case of many tools to be replaced. This causes the machine tool to wait for long periods of time which continue from the completion of machinings of one kind of workpiece until the initiation of machinings of other kind of workpieces.

Furthermore, in the latter type of the known numerically controlled machine tool, a tool replacing or transfer device is provided for exclusive use in the machine tool. More specifically, as disclosed in Japanese Pat. No. 53-21543 to the assignee of the present application, a frame of the transfer device is fixed on a frame of the tool magazine, and a transfer head is operably carried by the transfer device frame for replacing tools in the tool magazine with other tools having been supplied to the vicinity of the tool magazine. The machine tool system disclosed in the Japanese patent includes a number of numerically controlled machine tools, each of which has the same construction as the above-described numerically controlled machine tool, and thus requires the provision of a tool transfer device for each machine tool. This disadvantageously results not only in an increased production cost of the machine tool system, but also in complication of control of the machine tool.

SUMMARY OF THE INVENTION

It is therefore a primary object of the present invention to provide an improved numerically controlled machine tool system wherein a tool transfer device for replacing tools in a tool magazine of a numerically controlled machine tool with other tools supplied to the vicinity of the tool magazine is capable of moving along with a tool cart which transports tools to be supplied to the vicinity of the tool magazine, so that if necessary, the tool transfer device is moved along with the tool cart to the vicinity of a tool magazine of another numerically controlled machine tool so as to service the other numerically controlled machine tool.

Another object of the present invention is to provide an improved numerically controlled machine tool system capable of reducing the downtime which continues from the completion of machinings of one kind of workpiece until the initiation of machinings of another kind of workpiece.

Another object of the present invention is to provide an improved numerically controlled machine tool system in which during the machining of a last one of one kind of workpiece, a first group of tools being stored in a tool magazine for the one kind of workpiece can be successively replaced with a second group of tools for another kind of workpiece next to be machined, each time when each of the first group of tools no longer becomes necessary.

Briefly, these and other objects are achieved according to the present invention, by providing a numerically controlled machine tool system, which includes a numerically controlled machine tool having a tool magazine for storing a plurality of tools to be used on the numerically controlled machine tool and a tool stocker installed spaced apart from the numerically controlled machine tool. The tool stocker is provided for storing another plurality of tools, at least one of which is scheduled to be used on the machine tool. The system further includes a tool cart movable between the tool magazine and the tool stocker. The tool cart has mounted thereon a tool holding device and a tool transfer device. The tool holding device receives at least one tool transferred from the tool stocker when the tool cart is by the tool stocker. The tool transfer device transfers tools between the tool magazine and the tool holding device when the tool cart is by the tool magazine. A control circuit is further provided for controlling the movement of the tool cart and the transfer operation of the tool transfer device.

With this configuration, the tool transfer device is moved along with the tool cart which transports tools to be supplied to the vicinity of the tool magazine. This makes it possible for the transfer device to service another numerically controlled machine tool in the case where the tool cart is moved to the other machine tool so as to supply tools to the vicinity of a tool magazine of the other machine tool. Consequently, in the case where the system is expanded to include a plurality of numerically controlled machine tools, tool transfer devices of a smaller number than the machine tools included in the system can service all of the machine tools, thereby not only reducing the production cost of the system but also simplifying control of the system.

In another aspect of the present invention, the system includes a replacement instructing device, which generates replacing command data based upon data stored in a data storage device. The data stored in the data storage device relates to the kind of one lot of workpieces currently in machining and the kind of another lot of workpieces to be nextly machined and also relates to first and second groups of tools. The replacement instructing device outputs the replacing command data each time when each of the first group of tools in the tool magazine becomes unnecessary for the machining of the workpieces being machined. The system further includes a transfer controller, which operates each time the replacing command data is output from the replacement instructing device. The transfer controller, when so operating, controls the tool transfer device to replace each of the first group of tools in the tool magazine with one of the second group of tools held by the tool holding device in the vicinity of the tool magazine, during the machining of a last one of the one lot of workpieces.

Since the replacement instructing device outputs the replacing command data each time when each of the first group of tools in the tool magazine becomes unnecessary, the transfer controller is repeatedly operated while the last one of the one lot of workpieces is machined. Accordingly, replacements of the first group of tools with the second group of tools are performed in a parallel time relation with the machining of the last one of the one lot of workpieces. This results in shortening the time that is consumed for setting up in the tool magazine the second group of tools to be next used.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 5(a)–5(c) are explanatory views showing data tables provided in a central processor 50 shown in FIG. 4;

FIGS. 6(a) and 6(b) are explanatory views showing data tables provided in a tool replacing controller 51 shown in FIG. 4;

FIG. 10 is a flow chart of a data rewriting routine executed by the central processor 50 in response to a replacement completion signal from the tool replacing controller 51;

FIGS. 11(a) and 11(b) are explanatory views respectively showing the contents stored in the replacing tool data table shown in FIG. 5(c) before and after data rewriting;

FIG. 12(b) is a flow chart of another routine executed by the tool replacing controller 51 for tool replacement with the tool magazine;

FIG. 12(c) is a flow chart of still another routine executed by the tool replacing controller 51 for tool returning from the vicinity of the tool magazine 11 to the tool stocker 20;

DETAILED DESCRIPTION OF THE PREFERRED EMBODIMENT

Figure 1:
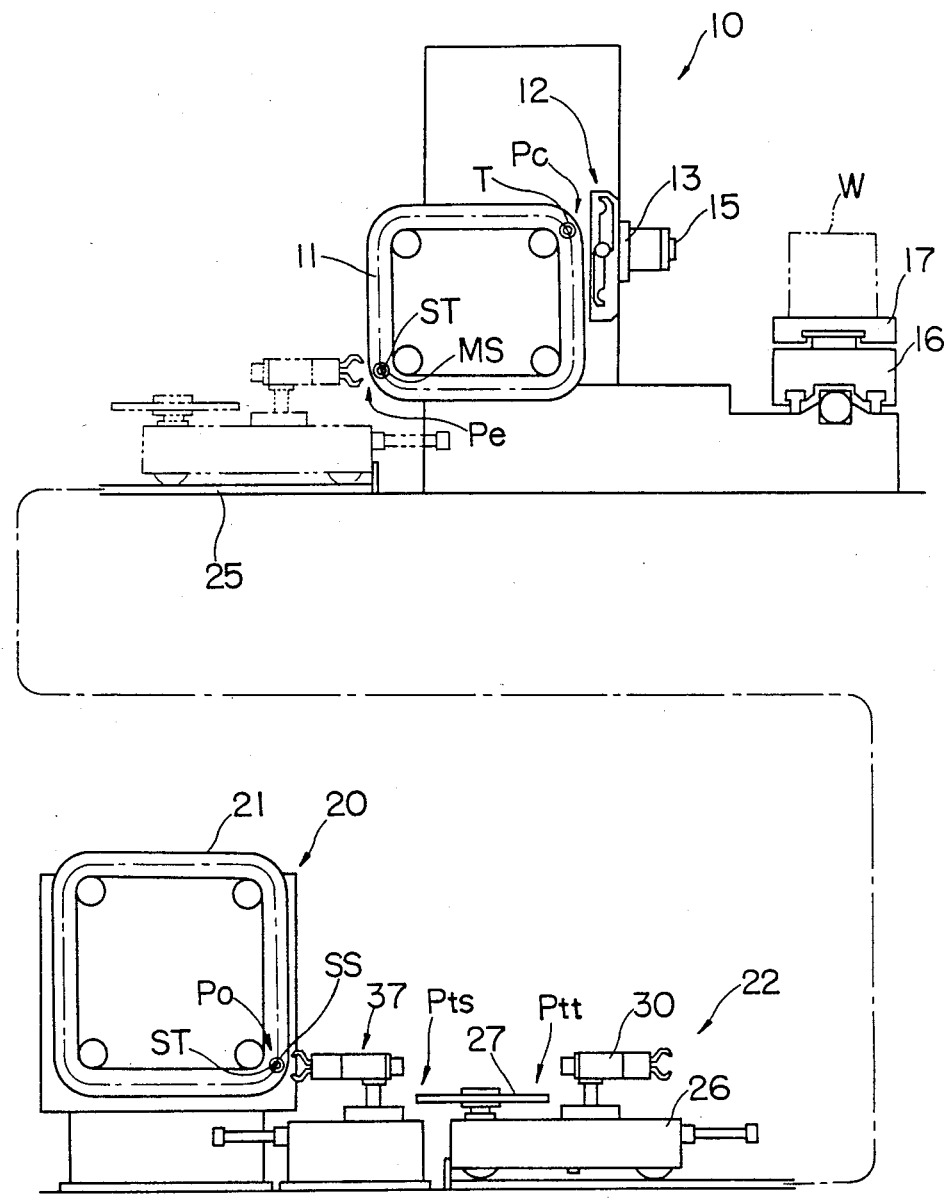
FIG. 1 is a schematic view showing the overall construction of the numerically controlled machine tool system according to the present invention.

Referring now to the drawings, wherein like reference numerals designate identical or corresponding parts throughout the several views, and particularly to FIG. 1 thereof, there is shown a numerically controlled machine tool 10 having a chain-type tool magazine 11, which is provided with a plurality of tool sockets MS. A plurality of tools T respectively stored in the tool sockets MS are selectively attached by a known tool changer 12 into a spindle tool 15 rotatably supported in a spindle head 13 for machining a workpiece W which is mounted on a table 16 through a pallet 17. Assuming now that the machine tool 10 is scheduled to machine eight kinds of workpieces Wa–Wh, for example, the tool magazine 11 has stored common tools which are commonly used for the eight kinds of workpieces Wa–Wh and is scheduled additionally to store a number of dedicated tools for a particular one of the eight kinds of workpieces Wa–Wh. The tool magazine 11 is rotationally indexable by an indexing mechanism, not shown, so that any required tool T is indexable to a tool change position Pc or a magazine tool replacing position Pe in accordance with a command from a numerical controller, as described in detail hereafter.

Reference numeral 20 designates a tool stocker for storing a plurality of dedicated tools ST which are selectively used in machining the eight kinds of workpieces Wa–Wh. The stocker 20 has a chain-type stock magazine 21 of the same configuration as the tool magazine 11 of the machine tool 10. The stock magazine 21 is provided with a plurality of stocker sockets SS respectively storing the dedicated tools ST and is rotationally indexable for successively indexing the dedicated tools ST to a stocker tool replacing position Po.

Figure 2:
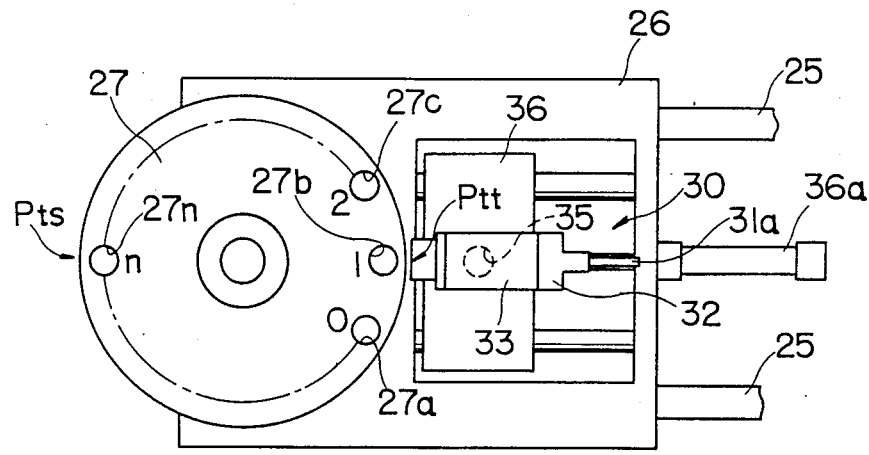
FIG. 2 is a plan view of a tool cart 22 shown in FIG. 1.
Figure 3A:
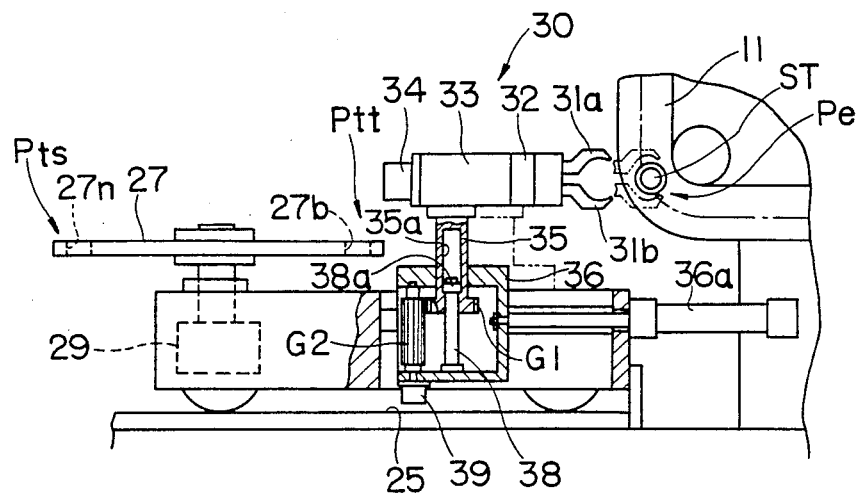
FIG. 3(a) is a front view of the tool cart 22 partly in cross-section, particularly illustrating a tool transfer device 30 in one mode of a tool replacing operation.
Figure 3B:
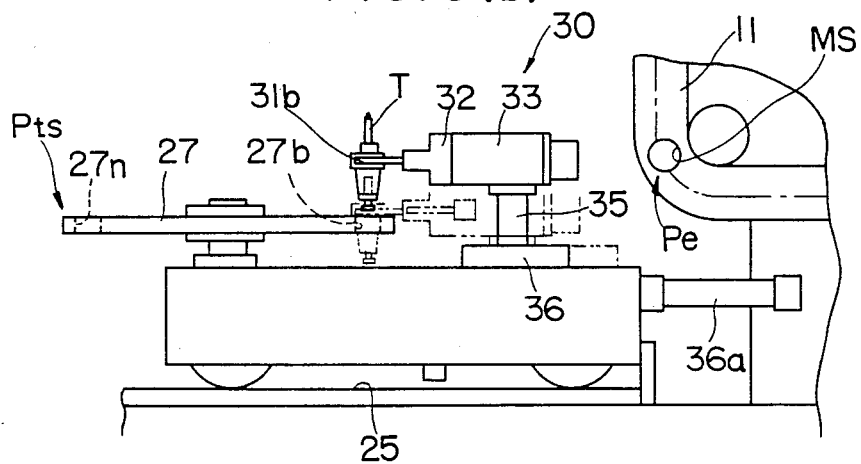
FIG. 3(b) is the same view of the tool cart 22, but illustrating the tool transfer device 30 in another mode of the tool replacing operation.

A pair of guide rails 25 are provided to extend between the tool stocker 20 and the tool magazine 11 of the machine tool 10. A self-propelled tool cart 22 is movable along the guide rails 25 for transferring the dedicated tools ST between the tool stocker 20 and the tool magazine 11. As shown in FIGS. 2, 3(a) and 3(b), a cart body 26 constituting the tool cart 22 horizontally pivotably carries at its side near the tool stocker 20 a disc-like transfer magazine 27, which is rotationally indexable by an indexing device 29 through a predetermined angle each time of operation of the indexing device 29. A plurality of tool holding stations or holes 27a-27n for vertically holding tools T are formed in a circumferential portion of the transfer magazine 27 at predetermined equiangular intervals. The cart body 26 also has mounted thereon a tool transfer device 30 at its side near the machine tool 10. The tool transfer device 30 includes a horizontally extending transfer arm 32, which is provided at its one end with a pair of grip fingers 31a and 31b operable by a cylinder device, not shown, to be opened or closed. The transfer arm 32 is carried by a bracket 33 and is rotatable by a rotary cylinder 34 about its horizontal axis. The bracket 33 is fixedly mounted on the top of a vertical hollow shaft 35, which is carried by a movable block 36 for movements along and about its vertical axis. In order to move vertically the bracket 33, the hollow shaft 35 is formed with a cylinder chamber 35a, in which a piston 38a with a piston rod 38 secured to the movable block 36 is contained for vertical sliding movement relative to the hollow shaft 35. In order to rotate the bracket about the hollow shaft 35, a gear G1 integral with the hollow shaft 35 is in meshing engagement with an elongated gear G2, which is carried in the movable block 36 to be rotated about a vertical axis by a drive motor 39. Further, the movable block 36 is movable by a shift cylinder 36a relative to the cart body 26 in a direction in which the guide rails extend. When the tool cart 22 is located by the machine tool, the above-described various mechanisms provided on the cart body 26 are operated in a predetermined sequence so that replacements of a number of the dedicated tools ST are carried out between the tool magazine 11 and the transfer magazine 27 as nextly described.

Namely, replacements of the dedicated tools ST are initiated by taking out a dedicated tool ST no longer required from the tool magazine 11 and then by storing it in the transfer magazine 27. In this operation, as shown by the solid line in FIG. 3(a), the height and the orientation of the transfer arm 32 are firstly changed to such a state that the grip fingers 31a and 31b are able to be respectively presented to diametrically opposite sides of another dedicated tool ST located at the magazine tool replacing position Pe of the tool magazine 11 when the movable block 36 is subsequently shifted. The shifting movement of the movable block 36 and the closing motion of the grip fingers 31a and 31b are subsequently effected to grip the dedicated tool ST located at the magazine tool replacing position Pe. Then, the transfer arm 32 is pivoted about the hollow shaft 35 through an angle of 180-degrees in a clockwise direction as viewed in FIG. 2 so as thereby to take out the dedicated tool ST from the tool socket MS at the magazine tool replacing position Pe. Ninety-degree rotation of the transfer arm 32 about its axis further follows to place the gripped dedicated tool ST in a vertical direction, as indicated by the solid line in FIG. 3(b). The dedicated tool ST is then inserted into one of the tool holding holes 27a-27n which is located at the magazine tool transfer position Ptt near the machine tool 10. Thereafter, the grip fingers 31a and 31b are opened, and the movable block 36 is moved toward the right to the position as indicted by the dot-dash line in FIG. 3(b), whereby the transferring of the dedicated tool ST is completed.

The transferring of a new dedicated tool ST from the magazine tool transfer position Ptt to the magazine tool replacing position Pe of the tool magazine 11 is performed by operating the transfer arm 32 in an order reverse to the foregoing transfer operation.

Furthermore, another tool transfer device 37 of the same configuration as the above-described tool transfer device 30 is installed by the tool stocker 20. This transfer device 37 is operated in the same manner as the transfer device 30, whereby the transferring of any dedicated tool ST is performed between the stocker tool replacing position Po defined in the tool stocker 20 and a stocker tool transfer position Pts defined in the transfer magazine 27 near the tool stocker 20 when the tool cart 22 is by the tool stocker 20.

Figure 4:
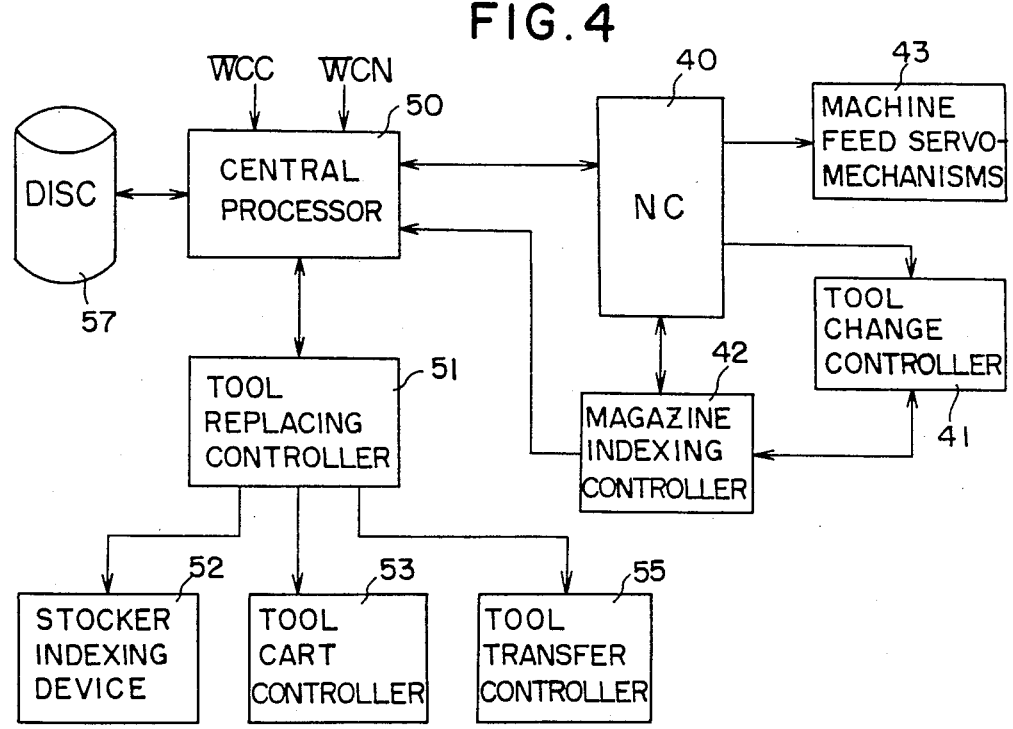
FIG. 4 is a block diagram showing a control circuit of the numerically controlled machine tool system shown in FIG. 1.

FIG. 4 shows an overall construction of a control circuit used in the above-described numerically controlled machine tool system. A numerical controller 40 installed at the site of the machine tool 10 is connected to a tool change controller 41 for controlling the operation of the tool change device 12 and a magazine indexing controller 42 for controlling the indexing operation of the tool magazine 11. The tool change controller 41 is responsive to code data M06 output from the numerical controller 40 for controlling the tool change device 12 to perform a tool change operation. The magazine indexing controller 42 controls the tool magazine 11 to index to the tool change position Pc a tool T corresponding to T-code data when only the T-code data is output from the numerical controller 40. Each of the T-code data includes a tool number of two digits. The magazine indexing controller 42 further controls the tool magazine 11 to index to the magazine tool replacing position Pe a tool T corresponding to T-code data when the T-code data and tool replacing command code data M70 are simultaneously output from the numerical controller 40. When the indexing of a designated tool to the magazine tool replacing position Pe in response to the tool replacing command data M70 is completed, the magazine indexing controller 42 applies an indexing completion signal M70FIN to the numerical controller 40 as well as to a central processor 50.

The magazine indexing controller 42 awaits completion of a tool change operation when receiving a successive indexing command during the tool change operation and initiates the indexing control of the tool magazine 11 in response to the successive indexing command upon completion of the tool change operation. Further, the tool change controller 41 prevents any tool change operation from being performed during an indexing operation of the tool magazine 11. These functions are achieved by providing the magazine indexing controller 42 and the tool change controller 41 with an interlocking relation.

The magazine indexing controller 42 is further designed such that when receiving the T-code data or the M-code data from the numerical controller 40, it outputs an operation completion signal FIN to the numerical controller 40 before initiating the indexing control of the tool magazine 11. This enables the numerical controller 40 to execute a successive machining program during an indexing operation of the tool magazine.

The central processor 50 is programmed selectively to transfer numerical control programs, each corresponding to the kind of workpiece to be machined as one lot, to the numerical controller 40 on a block-by-block basis and to control replacements of tools in cooperation with a tool replacing controller 51. Each time an unfinished workpiece is loaded onto the machine tool 10, the central processor 50 is supplied from a machining schedule governing computer (not shown) with data indicating the order in which, of the workpieces of the same kind, the unfinished workpiece is loaded onto the machine tool 10, data indicating a kind code WCC for the workpiece W, and data indicating another kind of code WCN for a different kind of workpieces W to be machined in succession. The central processor 50 is also connected to a disc memory unit 57, which stores numerical control programs used in machining the eight kinds of the workpieces Wa–Wh.

A core memory provided in the central processor 50 is formed with a magazine tool data table MMTT, a dedicated tool discrimination data table STDT and a magazine replacing tool data table ETMT, as shown in FIGS. 5(a)–5(c). The magazine tool data table MMTT is used to register tools T being stored in the tool magazine 11 of the machine tool 10 and stores tool reference numbers respectively allocated to the tools T, along with sockets numbers of the tool sockets respectively storing the tools T. The dedicated tool discrimination data table STDT registers dedicated tools ST used in machining the eight kind of the workpieces Wa–Wh, by storing tool reference numbers respectively allocated to the dedicated tools ST. The magazine replacing tool data table ETMT stores tool reference numbers of dedicated tools ST which are to be taken out from tool sockets of the tool magazine 11 in tool replacing operations, along with socket numbers of the tool sockets. The data table ETMT also stores tool reference numbers of other dedicated tools ST which are to be respectively stored in the tool sockets respectively in place of the dedicated tools to be taken out.

The tool replacing controller 51 is composed of, for example, a microcomputer and is connected through an interface (not shown) to the stocker indexing device 52, a tool cart controller 53 and a tool transfer controller 55. The stocker indexing device 52 operates in response to a command from the tool replacing controller 51 and positions a designated tool to the stocker tool replacing position Po. The tool cart controller 53 controls movement of the tool cart 22, indexing operation of the transfer magazine 27 carried on the tool cart 22 and tool replacing operation of the tool transfer device 30 carried on the tool cart 22. The tool transfer controller 55 controls the tool replacing operation of the tool transfer device 37 installed by the tool stocker 20. The tool replacing controller 51 is provided therein with a memory, in which a stocker tool data table TSTT shown in FIG. 6(a) and a stocker replacing tool data table ETT shown in FIG. 6(b) are assigned. The stocker tool data table TSTT registers dedicated tools ST being stored in the tool stocker 20, by storing tool reference numbers of the dedicated tools ST along with socket numbers of the stocker sockets respectively holding the dedicated tools ST. The stocker tool data table TSTT also stores tool reference numbers of dedicated tools ST which are to be taken out from the tool magazine 11 in subsequent tool replacing operations, along with tool reference numbers of other dedicated tools ST which are to be stored in the tool magazine 11 in substitution therefor.

The numerical controller 40 is further connected to three feed servomechanisms (i.e., X, Y and Z-axis servomechanisms) 43 of the machine tool 10 for controlling the operations of the servomechanisms in accordance with numerical control data or information. These feed servomechanisms, when operated, bring about relative movements between the tool spindle 15 and the workpiece W on the table 16 in an X-Y-Z axis coordinate system, as is well known in the art.

The operation of the control circuit as constructed above will be described hereinafter. The central processor 50 executes a program shown in FIG. 7 each time an unfinished workpiece is loaded onto the numerically controlled machine tool 10. The processor 50 ascertains whether the unfinished workpiece having been loaded onto the machine tool 10 is a first one, a second one or a last one of the workpieces of the same kind, respectively in steps 60, 61 or 62, based upon data supplied from the machining governing computer (not shown).

When the loaded workpiece is ascertained in step 60 to be the first one of the workpieces of the same kind, step 63 is then reached, wherein the processor 50 searches the disc memory unit 57 for a numerical control program which corresponds to the kind of the workpiece having been loaded onto the machine tool 10 and reads out the searched numerical control program therefrom to transfer the same to a first buffer area of an internal memory thereof in step 63. Step 64 next follows, in which the processor 50 executes processings for returning a number of dedicated tools ST which have been transferred through a number of previous tool replacing operations from the tool magazine 11 into the transfer magazine 27, to the tool stocker 20 during the machining operation of the first workpiece. Processing is advanced to step 70 and the processor 50 begins to transmit the searched numerical control program to the numerical controller 40, whereby the machining of the first workpiece is initiated.

When the workpiece having been loaded onto the machine tool 10 is ascertained to be the second one of the workpieces of the same kind, processing is moved from step 61 to step 67, in which in order to make itself ready for a series of tool replacing operations described later, the processor 50 reads out the same numerical control program as read out in step 63, from the disc memory unit 57 and modifies the numerical control program to those which enable the tool replacing operations to be performed in parallel time relation with the machining of the last one of the workpieces of the same kind. It is ascertained in the following step 68 whether the returning of a number of the dedicated tools ST from the transfer magazine 27 to the tool stocker 20 has been completed or not. processing in step 69 is executed to prepare dedicated tools ST which are needed in subsequently machining another or second kind of workpieces, during the machining of the second one of the previous or first kind of workpieces. Operation is then moved to step 70, wherein the processor 50 executes processing to transmit a numerical control program. This transmission processing of numerical control data is carried out by executing once an NC program distribution routine described later.

When the workpiece having been loaded onto the machine tool 10 is ascertained to be a last one of workpieces of the same kind, processing is moved from step 62 to step 65 to check as to whether the foregoing processing in step 69 for dedicated tool preparation has been completed or not. The confirmation of such completion advances processing to step 66, wherein the processor 50 transfers to the first buffer area of its internal memory the numerical control program which has been modified in step 67 for tool replacement. Step 70 is then executed to transmit the modified numerical control program to the numerical controller 40, whereby the machining of the last one of workpieces of the same kind is initiated and whereby replacements of the dedicated tools ST are successively performed during the machining operation, but only after each particular dedicated tools ST in the tool magazine 11 is no longer required. The numerical controller 40 controls the operations of the feed servomechanisms 43 in accordance with the numerical control program.

Detailed description will be made hereafter with respect to operations that the central processors 50 and the tool replacing controller 51 perform in modifying numerical control programs for dedicated tool replacement, in preparing dedicated tools, in replacing dedicated tools and in returning dedicated tools.

Modification of NC program for Tool Replacement

Figure 8A:
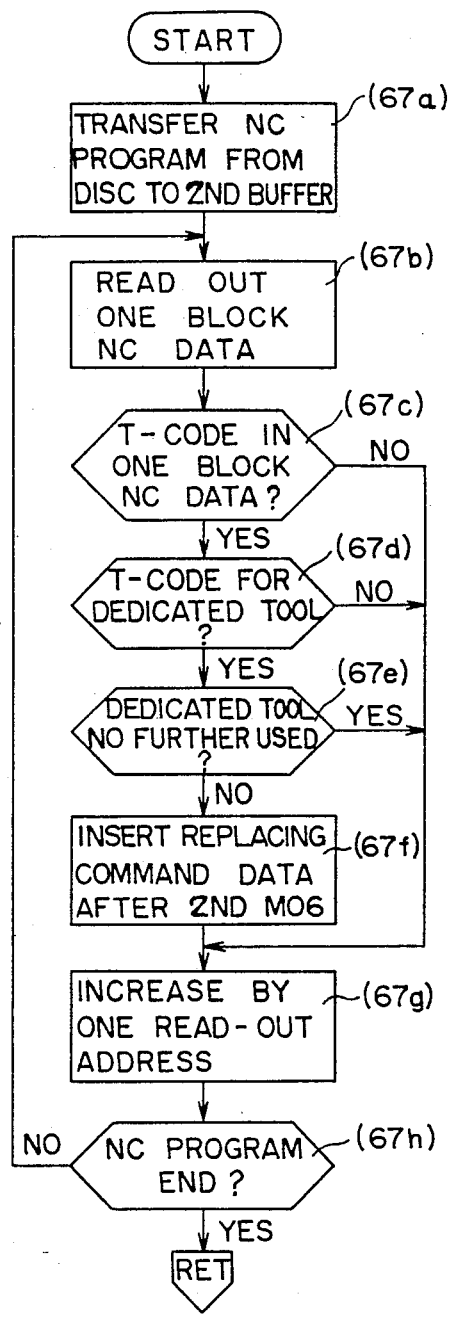
FIG. 8(a) is a flow chart of an NC program modification routine executed by the central processor 50 in step 67 of FIG. 7.

When a second one of workpieces of the same kind is loaded onto the machine tool 10, the central processor 50 firstly executes step 67 to modify a numerical control program which is used in replacing dedicated tools ST. FIG. 8(a) shows the detail processing steps that the processor 50 executes in step 67. Step 67 involves reading out from the disc memory unit 57 one numerical control program corresponding to the kind of the second workpiece which has been loaded onto the machine tool, so as to store the read-out numerical control program in a second buffer area, not shown, of the internal memory provided in the processor 50. The processor 50 then executes step 67b to read out numerical control data being stored in the second buffer area, block by block in an order from the smallest block number and in step 67c, ascertains whether each block of the read-out numerical control data includes T-code data or not. When it includes no T-code data, step 67g is then reached to increase by one the read-out designation address number of the second buffer area. Unless program end data is included in the data block designated by the increased designation address number, return is made from step 67h to step 67b to read out a next one block of the numerical control data.

When T-code data is included in the read-out data block, on the other hand, step 67c is followed by step 67d, wherein whether the T-code data designates a dedicated tool St or not is ascertained by reference to the magazine replacing tool data table ETMT. If no dedicated tool is designated, no processing is done to advance to step 67g, whereby another block of the numerical control data is then read out. If any dedicated tool ST is designated, it is ascertained in step 67e whether or not the dedicated tool ST is also designated in any successive block of the numerical control data being stored in the second buffer area. If it is the case, no processing is done to move to step 67g, while if it is not the case, the numerical control program in the second buffer area is modified in step 67f. This modification is done by inserting tool replacing command code data between two successive data blocks, a preceding one of which includes tool change code data M06 input second as counted from the read-out data block including the dedicated tool designation T-code data.

Figures 13A, 13B, 14:
FIGS. 13(a) and 13(b) are explanatory views respectively showing an original NC program and a modified NC program derived therefrom.
FIG. 14 is a time chart showing a timing relationship between workpiece machining operations with tool replacing operations.

Consider, by way of example, the foregoing modification processings in connection with a numerical control program shown in FIG. 13(a). Assuming now that T-code data "T3100" at a block number "N002" designates a dedicated tool ST and that no successive data block designates it, then numerical control data which instructs replacement of a dedicated tool ST having a tool reference number "N3100" is inserted immediately after a data block with block number "N016" which includes second tool change code data M06 as counted from the block number "N002". That is, in this case, numerical control data "T3100 M70" is inserted after the N016-data block, as shown in FIG. 13(b).

It should be noted herein that each T-code data in numerical control data is given to instruct that a particular tool designated thereby to be next used be indexed to the tool change position Pc during the machining operation of a workpiece. It should be also noted that when the tool change operation is performed twice after the indexing of the particular tool to the tool change position Pc, the particular tool is inserted into the machine tool spindle 15, is used in machining and is returned again to the tool magazine 11. Accordingly, when the tool replacing command data block inserted in the manner as described above is executed by the numerical controller 40 as described later in detail, the dedicated tool ST designated in the data block can be indexed to the magazine tool replacing position Pe and can be transferred therefrom to the transfer magazine 27. In other words, each dedicated tool ST which is not scheduled, to be used in subsequent machinings of a different kind of workpieces is returned to the transfer magazine 27 as soon as the use thereof in the machine tool 10 is completed.

It must be avoided that the indexing of any unnecessary dedicated tool ST to the magazine tool replacing position Pe causes any tool T which is scheduled to be next used, to leave the tool change position Pc. To this end, T-code data instructing that a tool to be next used be indexed to the tool change position Pc is programmed following each tool change command data M06 of each numerical control program being stored in the disc memory unit 57, as seen at, for example, block number "N016" shown in FIG. 13(a).

By repeatedly executing the processings in steps 67b-67h, the numerical control program being stored in the second buffer area is, as a whole, modified to make the execution of the tool replacing operations possible. The operation of the processor 50 is then advanced to step 68 in FIG. 7 upon completion of such modification processings of the numerical control program.

Preparation of Dedicated Tools

Figure 8B:
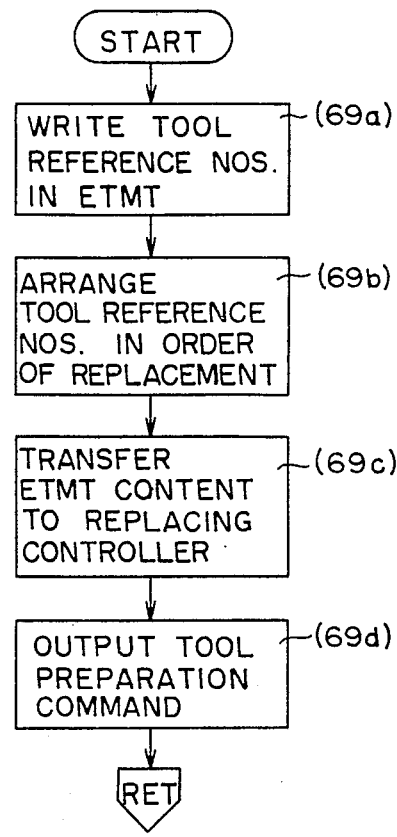
FIG. 8(b) is a flow chart of a next tool preparation routine executed by the central processor 50 in step 69 of FIG. 7.

After completing the modification of a numerical control program for tool replacements in the manner as described above, the processor 50 advances operation from step 68 to step 69 to execute processing the steps shown in FIG. 8(b). First of all, step 69a is executed, wherein reference numbers of the dedicated tools ST which are currently used in machining one lot of workpieces, reference numbers of dedicated tools ST which are scheduled to be used in subsequently machining a different lot of workpieces, and tool socket numbers of magazine tool sockets respectively storing the dedicated tools ST currently in use are read out from the dedicated tool discrimination data table STDT and the magazine tool data table MMTT and are written into the magazine replacing tool data table ETMT in an order in which they are read out, as shown in FIG. 11(a). The processor in step 69b arranges the tool reference number data having been written into the magazine replacing tool data table ETMT, in such an order that the dedicated tools ST having the reference numbers will be replaced.

That is, the order in which the dedicated tools ST presently in the tool magazine 11 will be replaced is checked by making reference to the modified numerical control program which has been obtained through the foregoing numerical control program processings for tool replacement. Based upon this checking result, a plurality of data sets, each including the reference number of a presently used dedicated tool ST, the reference number of a next used dedicated tool ST and the socket number of a magazine tool socket therefor, are arranged in such a way that the reference numbers of the presently used dedicated tools ST make a line of an order that they will be replaced. FIG. 5(c) illustrates the magazine replacing tool data table ETMT in which such arrangement has been completed.

When the write-in of the tool reference number data into the magazine replacing tool data table ETMT and the arrangement of the data therein are completed in the foregoing manner, step 69c is nextly reached to transfer the data from the magazine replacing tool data table ETMT to the stocker replacing tool data table ETT provided in the tool replacing controller 51. Step 69d then follows to cause the processor 50 to transmit a tool preparation command to the tool replacing controller 51.

Figure 12A:
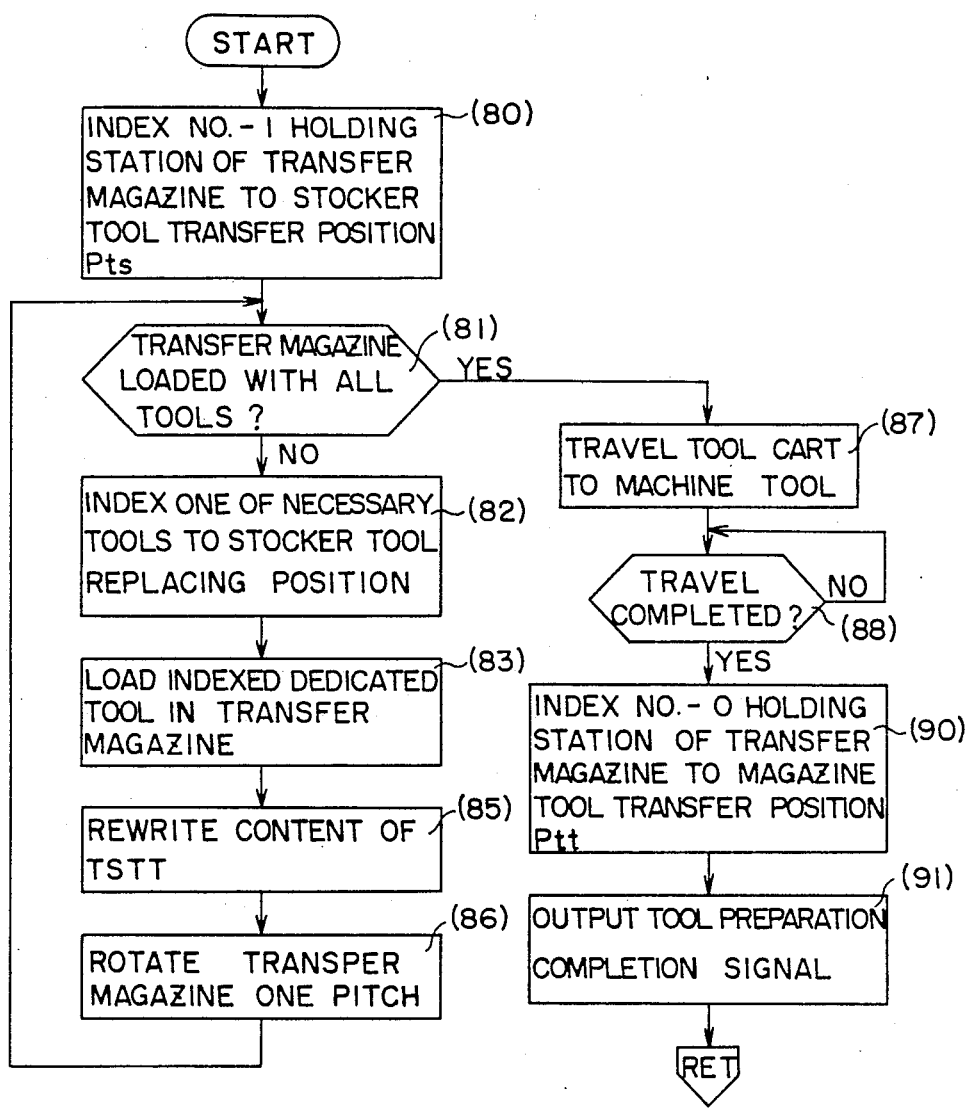
FIG. 12(a) is a flow chart of a routine executed by the tool replacing controller 51 for tool transferring from a tool stocker 20 to the vicinity of a tool magazine 11, both shown in FIG. 1.

In response to the tool preparation command, the replacing controller 51 is enabled to execute the processing steps shown in FIG. 12(a) and in step 80, rotates the transfer magazine 27 to index the No. 1-tool holding station thereof to the stocker tool transfer position PTs located by the tool stocker 20. Step 81 is then executed to ascertain whether all of the dedicated tools ST to be next used have been stored in the transfer magazine 27 or not. The following steps 82-86 are repeatedly executed until the storings of all of those tools ST in the transfer magazine 27 are completed. Thereafter, processing is moved from step 81 to step 87, whereby the tool cart 22 is travelled to the machine tool 10. Of the steps 82-86, step 82 involves comparing the content of the stocker replacing tool data table ETT with that of the stocker tool data table TSTT so as thereby to index another of the next used dedicated tools ST to the stocker tool replacing position Po. The tool transfer controller 55 is operated in step 83, so that the dedicated tool ST at the stocker tool replacing position Po is loaded to the tool holding station now located at the stocker tool transfer position PTs of the transfer magazine 27. In step 85, an empty indication mark, e.g., "0000" for indicating that a socket concerned is now empty is written in an area of the stocker tool data table TSTT corresponding to the socket number of the stocker tool socket from which the dedicated tool ST has been taken out. Thereafter, step 86 is executed to rotate the transfer magazine 27 through one pitch in a clockwise direction as viewed in FIG. 2.

The foregoing processing steps result in that a number of the next used dedicated tools ST are respectively held in the No. 1-tool holding station and other tool holding stations following it of the transfer magazine 27 in an order that they will be used. After the execution of step 87 causes the tool cart 22 to travel to the machine tool 10, the transfer magazine 27 is rotated in step 90 to bring its No. 0-tool holding station storing no tool to the magazine tool transfer position Ptt accessible by the tool transfer device 30 on the tool cart 22.

Replacement of Dedicated Tools

Figure 7:
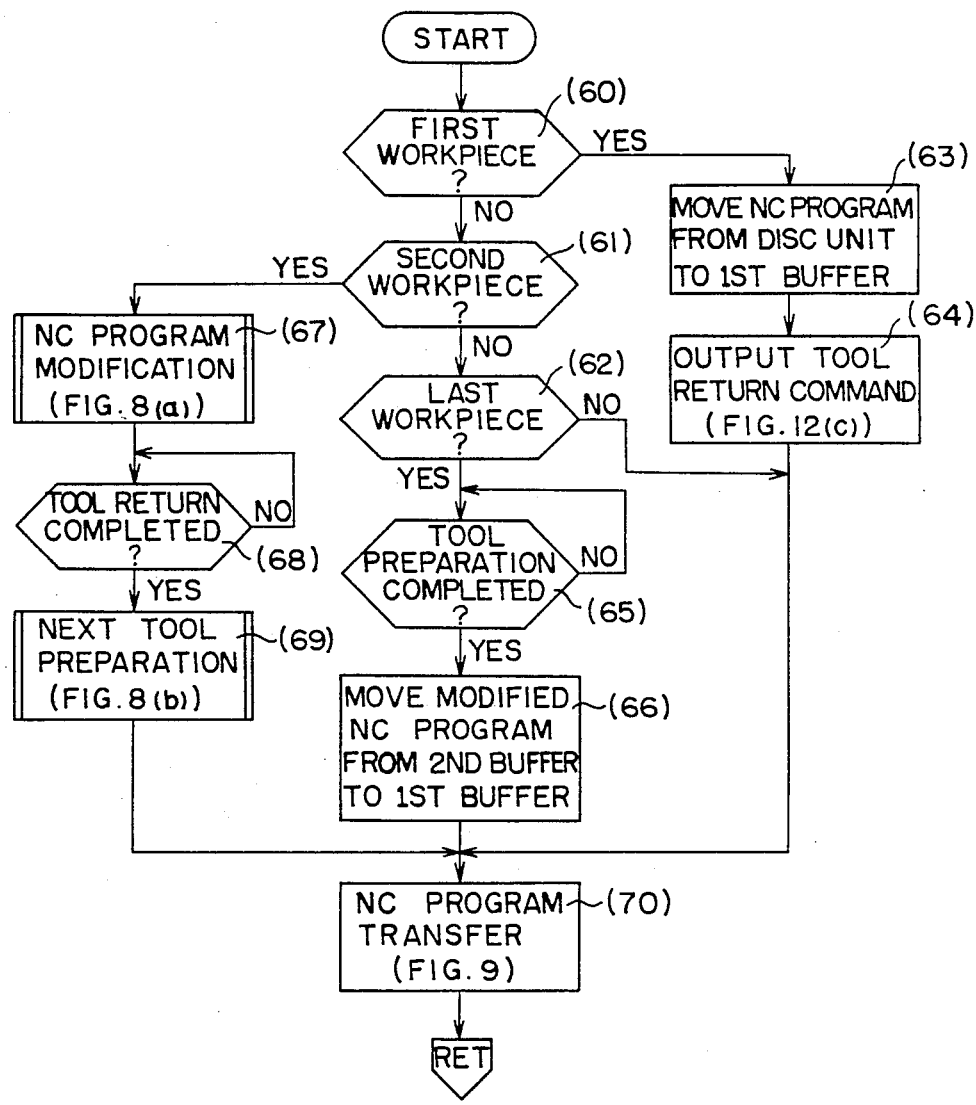
FIG. 7 is a flow chart of a routine executed by the central processor 50 each time one workpiece is loaded in a numerically controlled machine tool 10 shown in FIG. 1.

When a last one of workpieces of the same kind is loaded onto the machine tool 10, the processor 50 advances its processing from step 62 in FIG. 7 to step 65 to confirm that the foregoing processings for preparation of dedicated tools have been completed. After such confirmation, step 66 is executed, so that the numerical control program which has been modified for dedicated tool replacements is transferred from the second buffer area to the first buffer area. The processor 50 in the following step 70 executes the NC data transfer routine specifically shown in FIG. 9 to initiate the transferring of the modified numerical control program.

Figure 9:
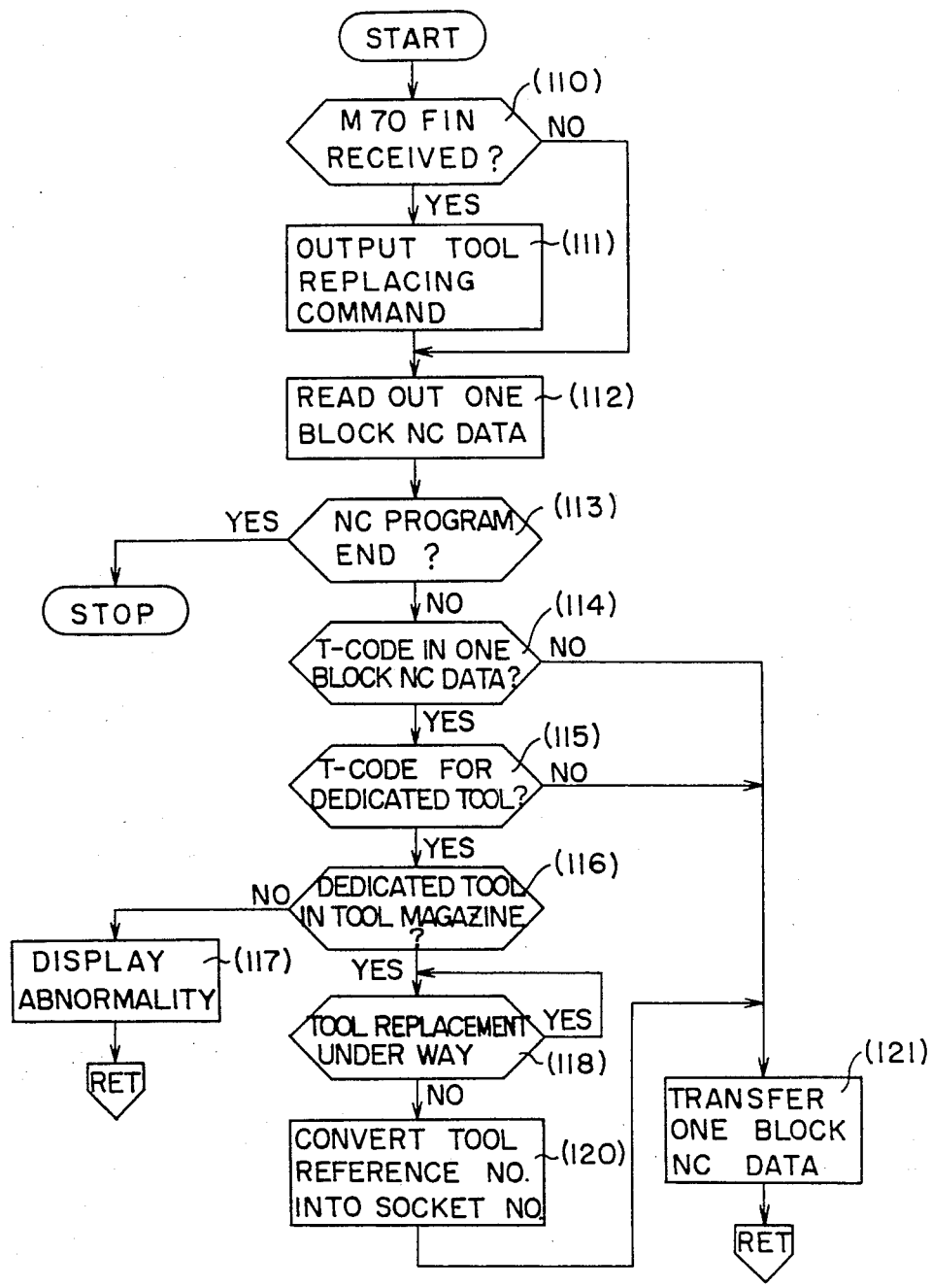
FIG. 9 is a flow chart of an NC program transfer routine executed by the central processor 50 either in step 70 of FIG. 7 or in response to a data request from a numerical controller 40 shown in FIG. 4.

The processing steps shown in FIG. 9 are not only executed as a subroutine in step 70 of FIG. 7, but also executed each time a data request is applied from the numerical controller 40. The execution of this routine generally results in reading out one block of the numerical control data in step 112 and transferring the read-out block of the numerical control data to the numerical controller 40 in step 121.

Further, in the case of the read-out block data including any T-code data, the routine is moved from step 114 to step 115, wherein reference is made to the magazine replacing tool data table ETMT so as to ascertain whether the T-code data designates a dedicated tool ST or not. Reference is made again to the magazine replacing tool data table ETMT in step 116a so as to further ascertain whether the dedicated tool ST designated by the T-code data is in the tool magazine 11 or not. Confirming that the designated dedicated tool ST is not in the tool magazine 10, the processor 50 displays an abnormality in step 117 without executing the transfer processing in step 121. Confirming the presence of the designated dedicated tool ST, alternatively, the processor 50 checks in step 118 as to whether the replacing operation for the tool ST is under way. After "No" is answered in step 116 or 118, there comes step 120 to convert the T-code data of the read-out block data, and the read-out one block data with the converted T-code data is transferred to the numerical controller 40 in step 121.

In the processing for T-code conversion, the magazine tool data table MMTT (FIG. 5(a)) is searched for the socket number of the magazine tool socket now storing the tool which is designated by the T-code data of the read-out data block. Further, the socket number so searched is of two digits and is replaced with the four-digit T-code data in the read-out numerical control data block so as to be used as T-code data to the numerical controller 40.

Further, it is ascertained in the first step 110 of this routine whether the magazine indexing controller 42 has output an indexing complete signal M70F1IN indicating that the dedicated tool ST designated by previously transferred T-code data has been indexed to the magazine tool replacing position Pe. In the case where the indexing completion signal M70F1N has been output, step 111 is executed to instruct tool replacement to the tool replacing controller 51, whereafter steps 112-121 for numerical control data transfer processings are then executed. Accordingly, the step 70 of FIG. 7 in this case involves applying a tool replacing command to the tool replacing controller 51 and transferring modified one block of numerical control data to the numerical controller 40, whereby one machining step on a last one of the same kind of workpieces and the replacement of one dedicated tool ST are performed in a parallel time relation. As the routine shown in FIG. 9 is repeatedly executed in response to each data request from the numerical controller 40, a number of dedicated tools ST can be replaced during machining operations on the last one of the same kind of the workpieces.

More specifically, assuming now that a numerical control operation in accordance with the N016-data block of the modified numerical control data shown in FIG. 13(b) has been completed and that a tool replacing command "T3100 M70" programmed in the N017-data block has just been read out in step 112 of FIG. 9, then the read-out data block is transferred to the numerical controller 40 in step 121 after the code conversion of the T-code data "T3100" in step 120. Thus, data "T02 M70" is given to the magazine indexing controller 42 through the numerical controller 40, whereby a dedicated tool ST being stored in the No. 2-tool socket, namely having the reference number "T3100" is indexed to the magazine tool replacing position Pe.

As described earlier, the magazine indexing controller 42 sends the operation completion signal FIN back to the numerical controller 40 before initiating the indexing operation of the tool magazine 11. This enables the numerical controller 40 to apply another data request to the central processor 50 at the same time when the indexing movement of the tool magazine 11 is initiated. In response to the data request, the central processor 50 transfers another block of numerical control data which, following the tool replacing command block, is programmed for a machining operation. As a result, the machining of the last one of the same kind of the workpieces is continued even while the indexing operation of the tool magazine 11 is carried out as a part of the tool replacing operation, as illustrated in FIG. 14.

When the dedicated tool St designated in the N017-data block is brought into the magazine tool replacing position Pe, the indexing completion signal M70FIN is output from the magazine indexing controller 52 to the central processor 50. The outputing of the indexing completion signal M70FIN is confirmed in step 110 as the central processor 50 executes the data transfer routine shown in FIG. 9 in response to the data request from the numerical controller 40. Step 111 is therefore next executed with the result of applying the tool replacing command to the tool replacing controller 51.

The controller 51 upon receipt of the tool replacing command instructs the tool cart controller 53 to load the dedicated tool ST, having been indexed to the magazine tool replacing position Pe, into the transfer magazine 27 in step 95 of FIG. 12(b) and in step 96, to rotate the transfer magazine 27 through one pitch in a clockwise direction as viewed in FIG. 2. The tool replacing controller 51 in step 97 further instructs the tool cart controller 53 to insert the dedicated tool St, having been indexed to the magazine tool transfer position Ptt, into the magazine tool socket having been located at the magazine tool replacing position Pe.

As mentioned previously, the transfer magazine 27 presents its No. 0-tool holding station receiving no tool to the magazine tool transfer position Ptt upon completion of the foregoing tool preparation operation. Consequently, the execution of the above-described tool replacing operation results first in transferring the unnecessary dedicated tool ST from the tool socket MS located at the magazine tool replacing position Pe to the No. 0-tool holding station of the transfer magazine 27 and then in transferring the next used dedicated tool ST at the No. 1-tool holding station of the transfer magazine 27 into the same tool socket MS located at the magazine tool replacing position Pe.

The tool replacing controller 51 upon completion of such a tool replacing operation outputs a replacing completion signal to the central processor 50, which then executes a data table rewriting routine shown in FIG. 10 in response to the completion signal. Executing this routine, the processor 50 in step 125 finds out the reference number of the dedicated tool ST newly loaded into the tool magazine 11, by making reference to the magazine replacing tool data table ETMT and writes the found reference number in the storage area of the magazine tool data table MMTT which corresponds to the tool socket MS now storing the newly loaded dedicated tool ST. Step 126 is then reached, wherein as shown in FIG. 11(b), a mark "*" representing toll removal from the tool magazine 10 is put on the last portion of the row of the replacing tool data table ETMT storing the reference number of the dedicated tool ST which has been removed from the tool magazine 11 in the latest tool replacing operation.

Each time the tool replacing command block added to the numerical control program is executed by the numerical controller 40, the foregoing tool replacing operation is performed, and the dedicated tools ST being stored in the tool magazine 11 are successively respectively replaced with the next used dedicated tools ST in such an order as they become unnecessary for machining of the particular lot of workpieces. Accordingly, all of the next used dedicated tools ST are prepared in the tool magazine 11 when the machining of the last one of the same kind of the workpieces is completed.

There may be a case that the machining of the last one of the same kind of workpieces is performed again from the beginning after the automatic operation of the numerical controller 40 is discontinued for the reason of tool breakage during the initial machining. When the machining is performed again, some of the dedicated tools ST for the kind of the workpieces might have been already removed from the tool magazine 11, which makes it impossible to carry out correct machining of the last workpiece. To avoid this, in this particular embodiment, the occurrence of an abnormality is decided when one block of numerical control data read out from the first buffer area of the processor internal memory designates any dedicated tool ST having been taken out from the tool magazine 11.

More specifically, the central processor 50, when executing step 115 of the NC program transfer routine shown in FIG. 9, ascertains whether the read out block data designates a dedicated tool ST or not. This ascertainment is done by checking as to whether the reference number of the designated dedicated tool ST has been written in the magazine replacing tool data table ETMT or not. When it has been written therein, a check is further made as to whether or not the mark "*" representing tool removal from the tool magazine 11 has been written in the last portion of the row registering the reference number. Recognizing the mark "*" in the last portion, the processor 50 displays an abnormality in step 117 to halt the numerical control operation. It will be realized from the above description that the marks "*" in the magazine replacing tool data table ETMT are all erased when the machining of a first one of another kind of workpieces is initiated following the replacing operations of all the next used dedicated tools ST.

Returning of Dedicated Tools

Processing steps for returning the dedicated tools ST whose uses have been completed with respect to the machining of one kind of workpiece are performed during the subsequent machining of a first one of another kind of workpiece, as mentioned earlier. In response to the tool return command that the central processor 50 outputs in step 64 of FIG. 7, the tool replacing controller 51 executes step 100 of FIG. 12(c) to travel the tool cart 22 to the tool stocker 20. The completion of this travel causes step 102 to be next executed, resulting in that the transfer magazine 27 is rotationally indexed to present its No. 0-tool holding station to the stocker tool transfer position Pts located by the tool stocker 20. Subsequently, steps 105–108 are repeatedly executed, whereby the unnecessary dedicated tools ST in the transfer magazine 27 are successively returned into the tool stocker 20.

More specifically, step 105 is executed to determine an empty one of the stocker sockets by making reference to the stocker tool data table TSTT shown in FIG. 6(a) and to index the found empty stocker socket to the stocker tool replacing position Po. Step 106 follows, in which the dedicated tool ST at the stocker tool transfer position Pts is transferred and inserted into the empty stocker socket at the stocker tool replacing position Po. The stocker replacing tool data table ETT is then searched in step 107 for the reference number of the dedicated tool ST now returned to the tool stocker 20, and the searched reference number is written to the area of the stocker tool data table TSTT which corresponds to the number of the stocker socket now storing the returned dedicated tool ST. The subsequent execution of step 108 causes the transfer magazine 27 to rotate one pitch in a clockwise direction. The repetitive executions of these steps 105–108 result in returning all of the unnecessary dedicated tools ST in the transfer magazine 27 to the tool stocker 20, and this is ascertained in step 103, thus completing the execution of the tool returning routine.

For the purpose of replacements of dedicated tools, in the above-described embodiment, a numerical control program is modified right before the machining of a second one of the same kind of workpieces is initiated. However, such on-line modification of the numerical control program is necessarily required for that purpose. Instead, a numerical control program modified for replacement of dedicated tools and another numerical control program not so modified may be stored in the disc memory unit 57 for use in machining one kind of workpiece, and the modified numerical control program may be read out and transferred to the numerical controller 40 to be used only in machining a last one of the same kind of the workpieces.

In another way, there may not be used any numerical control program modified for replacement of dedicated tools. In this case, the central processor 50 may determine the time when each dedicated tool becomes unnecessary, based upon numerical control data blocks that the central processor 50 successively transfers to the numerical controller 40, and may directly give the magazine indexing controller 42 and the tool replacing controller 51 instructions to effect the foregoing replacement of each dedicated tool when the same becomes unnecessary.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A numerically controlled machine tool system wherein a first group of dedicated tools which are stored in a tool magazine are replaced with a second group of dedicated tools in connection with a change in kind between a first lot of workpieces currently in machining and a second lot of workpieces next to be machined, said system comprising:

a machine tool having said tool magazine for selectively storing said first and second groups of said dedicated tool in addition to other tools commonly used in machining said first and second lots of said workpieces, said tool magazine being capable of presenting any one of said tools stored therein to a magazine tool replacing position;

tool supply means for supplying to the vicinity of said tool magazine said second group of said dedicated tools subsequently used in machining said second lot of said workpieces;

tool replacing means for replacing one of said second group of said dedicated tools in the vicinity of said tool magazine with one of said first group of said dedicated tools at said magazine tool replacing position;

data storage means for storing data relating to kinds of said first and second lots of said workpieces and also relating to said first and second groups of said dedicated tools;

replacement instructing means responsive to said data stored in said data storage means for outputting replacing command data each time each of said first group of said dedicated tools becomes unnecessary for machining a last one of said first lot of said workpieces;

magazine control means responsive to said replacing command data output by said replacement instructing means for controlling said tool magazine to present to said magazine tool replacing position each of said first group of said dedicated tools whose replacement is instructed by said replacing command data during the machining of said last one of said first lot of said workpiece; and replacement control means operable each time said tool magazine presents each of said first group of said dedicated tools to said magazine tool replacing position for controlling said tool replacing means to replace said each of said first group of said dedicated tools at said magazine tool replacing position with one of said second group of said dedicated tools in the vicinity of said tool magazine during said machining of said last one of said first lot of said workpieces.

2. A numerically controlled machine tool system wherein a first group of dedicated tools which are stored in a tool magazine are replaced with a second group of dedicated tools in connection with a change in kind between a first lot of workpieces currently in machining and a second lot of workpieces next to be machined, said system comprising:

a machine tool having said tool magazine for selectively storing said first and second groups of said dedicated tools in addition to other tools commonly used in machining said first and second lots of said workpieces, said tool magazine being capable of presenting any one of said tools stored therein to a magazine tool replacing position;

at least two feed servomechanisms provided in said machine tool for effecting relative movement between a tool spindle and a work table of said machine tool;

tool supply means for supplying to the vicinity of said tool magazine said second group of said dedicated tools subsequently used in machining said second lot of said workpieces;

tool replacing means for replacing one of said second group of said dedicated tools in the vicinity of said tool magazine with one of said first group of said dedicated tools at said magazine tool replacing position;

magazine control means responsive to replacing command data given thereto for controlling said tool magazine to present to said magazine tool replacing position each of said first group of said dedicated tools whose replacement is instructed by said tool replacing command data;

a numerical controller connected to said at least two feed servomechanisms for controlling the operation of said at least two feed servomechanisms in accordance with numerical control data given thereto, said numerical controller being capable of transmitting to said magazine control means each of tool replacing command data included in said numerical control data;

program storage means for storing first and second numerical control programs respectively associated with said first and second lots of said workpieces;

program modifying means for preparing a modified numerical control program by inserting said tool replacing command data into said first numerical control program so that each of said first group of said dedicated tools is replaced with one of said second group of said dedicated tools when becoming unnecessary in machining a last one of said first lot of said workpieces; and data transfer means for successively transferring control data blocks of said first numerical control program to said numerical controller when one of said first lot of said workpieces except for said last one thereof is machined by said machine tool, and for successively transferring control data blocks of said modified numerical control program to said numerical controller when said last one of said first lot of said workpieces is machined by said machine tool.

3. A numerically controlled machine tool system as set forth in claim 2, wherein said tool supply means comprises:
a tool stocker installed with a predetermined space from said tool magazine of said machine tool and capable of storing said first and second groups of said dedicated tools; and
a tool cart capable of selectively carrying said first and second groups of said dedicated tools and movable between said tool stocker and said tool magazine for selectively transporting said first and second groups of said dedicated tools therebetween.

4. A numerically controlled machine tool system as set forth in claim 3, wherein:
said tool replacing means is mounted on said tool cart.

5. A numerically controlled machine tool system wherein a first group of tools stored in a tool magazine are replaced with a second group of tools in connection with a change in kind between a first lot of workpieces currently in machining and a second lot of workpeices next to be machined, said system comprising:
a machine tool including at least two feed servomechanisms for effecting relative movement between a tool spindle and a work table of said machine tool and said tool magazine for selectively storing said first and second groups of said tools;

tool supply means for supplying to the vicinity of said tool magazine said second group of said tools subsequently used in machining said second lot of said workpieces;

tool replacing means for replacing one of said first group of said tools presented to a tool replacing position of said tool magazine with one of said second group of said tools in the vicinity of said tool magazine;

magazine control means responsive to replacing command data given thereto for controlling said tool magazine to present to said tool replacing position one of said first group of said tools whose replacement is instructed by said replacing command data given thereto;

a numerical controller connected to said at least two feed servomechanisms for controlling the operation of said at least two feed servomechanisms in accordance with numerical control data given thereto, said numerical controller being capable of transmitting said replacing command data given thereto to said magazine control means;

program storage means for storing first and second numerical control programs respectively associated with said first and second lots of said workpieces; and a data processor connected to said program storage means and said numerical controller and including:

data transfer means for successively transferring control data blocks of said first numerical control program to said numerical controller when one of said first lot of said workpieces except for a last one thereof is machined by said machine tool, and for transferring said replacing command data to said numerical controller in addition to said control data blocks when said last one of said first lot of said workpieces is machined by said machine tool so that each of said first group of said tools is replaced with one of said second group of said tools when becoming unnecessary for machining said last one of said first lot of said workpieces.

6. A numerical controlled machine tool system as set forth in claim 5, wherein said data process further includes:
program modifying means for preparing a modified numerical control program by inserting said replacing command data into said first numerical control program so that each of said first group of said dedicated tools is replaced with one of said second group of said dedicated tools when becoming unnecessary for machining said last one of said first lot of said workpieces;
said data transfer means being operable for successively transferring control data blocks of said modified numerical control program when said last one of said first lot of said workpieces is machined on said machine tool.

* * * * *